(12) United States Patent
Semper (10) Patent No.: US 8,379,550 B2
(45) Date of Patent: Feb. 19, 2013

(54) LOCATION BASED FEMTOCELL DEVICE CONFIGURATION AND HANDOFF

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 12/213,786

(22) Filed: Jun. 24, 2008

(65) Prior Publication Data
US 2009/0196253 A1 Aug. 6, 2009

Related U.S. Application Data

(60) Provisional application No. 61/006,778, filed on Jan. 31, 2008.

(51) Int. Cl.
H04B 7/00 (2006.01)
(52) U.S. Cl. ....................................................... 370/310
(58) Field of Classification Search .................. 370/310, 370/328, 331, 332, 464, 465, 466; 455/403, 455/422, 435–437, 456
See application file for complete search history.

(56) References Cited

U.S. PATENT DOCUMENTS

| | | | | |
|---|---|---|---|---|
| 5,907,808 | A * | 5/1999 | Vaara et al. | 455/441 |
| 7,613,444 | B2 * | 11/2009 | Lindqvist et al. | 455/403 |
| 7,817,997 | B2 * | 10/2010 | Nylander et al. | 455/422.1 |
| 2007/0097939 | A1 | 5/2007 | Nylander et al. | |
| 2007/0097983 | A1 | 5/2007 | Nylander et al. | |
| 2007/0105568 | A1 | 5/2007 | Nylander et al. | |
| 2008/0293433 | A1 * | 11/2008 | Wallis | 455/456.1 |
| 2009/0047945 | A1 * | 2/2009 | Zhang et al. | 455/424 |
| 2009/0067417 | A1 * | 3/2009 | Kalavade et al. | 370/356 |
| 2009/0092107 | A1 * | 4/2009 | Cai et al. | 370/338 |
| 2009/0093251 | A1 * | 4/2009 | Cai et al. | 455/436 |
| 2009/0129263 | A1 * | 5/2009 | Osborn | 370/230 |
| 2009/0168766 | A1 * | 7/2009 | Eyuboglu et al. | 370/353 |

FOREIGN PATENT DOCUMENTS

WO WO 2007/126351 A1 11/2007

OTHER PUBLICATIONS

Notification of Transmittal of the International Search Report and the Written Opinion of the International Searching Authority, or the Declaration dated Jul. 28, 2009 in connection with PCT Application No. PCT/KR2008/007215.

* cited by examiner

*Primary Examiner* — Dmitry H Levitan (57) ABSTRACT

Methods and apparatus for configuring femtocell devices for performing handoffs in a communication system. The communication system is provided with a plurality of macrocell base stations, a femtocell device, a wireless softswitch and a mobile node. In the communication system, each macrocell base station serves a macro cell, and the femtocell device serves a femto cell and is disposed in one of the plurality of macro cells. The wireless softswitch is communicatively connected with the plurality of macrocell base stations and the femtocell device, and stores geographic coverage area information for each of the plurality of macrocell base stations. The mobile node is originally disposed within the femto cell and moves out of the femto cell. The mobile node transmits a registration message to the femtocell device. The femtocell device forwards the registration message and geographical location information for the femtocell device to the wireless softswitch. The wireless softswitch determines which one of the plurality of macrocell base stations covers the macro cell where the femtocell device is disposed, in dependence upon the received geographical location information for the femtocell device and the stored geographic coverage area information for each of the plurality of macrocell base stations. Then, the wireless softswitch forwards the registration message to the macrocell base station determined.

20 Claims, 8 Drawing Sheets

FIG. 1A

(PRIOR ART)

LOCATION BASED FEMTOCELL DEVICE CONFIGURATION AND HANDOFF

CLAIM OF PRIORITY

This application makes reference to, incorporates the same herein, and claims all benefits accruing under 35 U.S.C. §119 from a provisional application earlier filed in the U.S. Patent & Trademark Office on 31 Jan. 2008 and there duly assigned Ser. No. 61/006,778.

BACKGROUND OF THE INVENTION

1. Field of the Invention

The present invention relates to methods and apparatus for configuring femtocell devices for performing handoffs in a communication system.

2. Description of the Related Art

Femtocell devices are small base stations designed for home or small business use. Femtocell devices provide cellular coverage having a small (<200 m) range, and are designed to provide cellular coverage in the home or office. The typical femtocell device connects to Security Gateway or Softswitch over an Internet Protocol (IP) connection, such as a Digital subscriber line (DSL) or broadband cable connection. The femtocell devices are intended to plug into a DSL or a cable modem using a standard Ethernet cable.

Handoffs of users from femtocell devices to the macro-network which contains the femtocell devices is usually performed using standard inter-operability messaging. If the femtocell device is using the same air interface technology as the macro network, the handoff is performed in the following procedure. The user, i.e., a mobile note, monitors pilots from the macro-network and reports the pilot strength measurement to the femtocell device serving an area where the mobile note is located. If the mobile node ventures outside the range of the femtocell device (leaves the house, for example), the femtocell device will determine, based on pilot strength measurement reports received from the mobile, that a handoff to the macro-network is needed. Using configured parameters, the femtocell device associates the pilot pseudo-random (PN) number with the sector_identity (ID) of the macro base station serving the area to which the mobile node is moved, and forwards the sector_ID to a softswitch using the standard handoff messaging. The softswitch then forwards the sector_ID to a Mobile Switch Center (MSC), which, using the sector_ID, contacts the appropriate macro base station to arrange the handoff.

Similar messaging can be used for inter-technology handoffs. In this case, the mobile node may receive pilots from the macro-network, but the mobile node will not report these pilots to the femtocell device, because the femtocell device is operating with a different technology. In this situation, the mobile may initiate a handoff by sending a message to the femtocell device that is destined for the macro-network, such as a Registration Message. Again, the femtocell device must be provisioned with the sector_ID or some type of identification for the macro base station, so that when the message is forwarded to the softswitch, it can determine which macro base station to contact.

The disadvantage of the contemporary inter-technology handoff process is that the femtocell devices need to be configured with some type of identifier (sector_ID, IP address, etc.) for the macro base station that is covering the area that the femtocell device is deployed in. Since a single macro base station may encompass a large area, many femtocell devices may need to be configured with this information at the time of deployment. Additionally, once configured with the information of the macro base station, the femtocell device can not move to a new location (i.e. into the coverage area of another macro base station) without being re-configured.

Such manual configurations are costly and can lead to errors in deployment. Therefore, there exists a need for a method by which femtocell devices can be dynamically configured, so that inter-technology handoffs to macrocell networks can be accomplished, even if the femtocell device moves to a new location served by a different macrocell base station.

SUMMARY OF THE INVENTION

It is therefore an object of the present invention to provide an improved method and apparatus for handling handoffs.

It is another object of the present invention to provide an improved method and apparatus for handling handoffs smoothly and cost effectively.

According to one aspect of the present invention, a wireless softswitch in a communication system is constructed with a memory block and a control block. The wireless softswitch is communicatively connected with a plurality of macrocell base stations and at least one femtocell device that is disposed in an area covered by a macrocell base station. The memory block of the wireless softswitch stores geographical coverage area information of each of the plurality of macrocell base stations. When the wireless softswitch receives a registration message for handoff from a femtocell device containing geographical location information of the femtocell, the control block of the wireless softswitch determines which one of the plurality of macrocell base stations covers the area where the femtocell device is disposed, in dependence upon the geographical location information of the femtocell device and the geographic coverage area information of each of the plurality of macrocell base stations stored in the memory block. Then, the control block of the wireless softswitch forwards the registration message to the macrocell base station determined.

According to another aspect of the present invention, a femtocell device in a communication system is constructed with a receiving block and a signaling block. The receiving block receives a registration message from a mobile node which is moving out of the femto cell served by the femtocell device. The signaling block attaches geographical location information of the femtocell device to the registration message and transmits the registration information to a wireless softswitch.

According to still another aspect of the present invention, a communication system for performing handoff is provided with a plurality of macrocell base stations, a femtocell device, a wireless softswitch and a mobile node. In the communication system, each macrocell base station serves a macro cell, and the femtocell device serves a femto cell and is disposed in one of the plurality of macro cells. The wireless softswitch is communicatively connected with the plurality of macrocell base stations and the femtocell device, and stores geographic coverage area information of each of the plurality of macrocell base stations. The mobile node is originally disposed within the femto cell and moves out of the femto cell. The mobile node transmits a registration message to the femtocell device. The femtocell device forwards the registration message and geographical location information of the femtocell device to the wireless softswitch. The wireless softswitch determines which one of the plurality of macrocell base stations covers the macro cell where the femtocell device is disposed, in dependence upon the received geographical location information of the femtocell device and the stored geographic coverage area information of each of the plurality of macrocell base stations. Then, the wireless softswitch forwards the registration message to the macrocell base station determined.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1A:
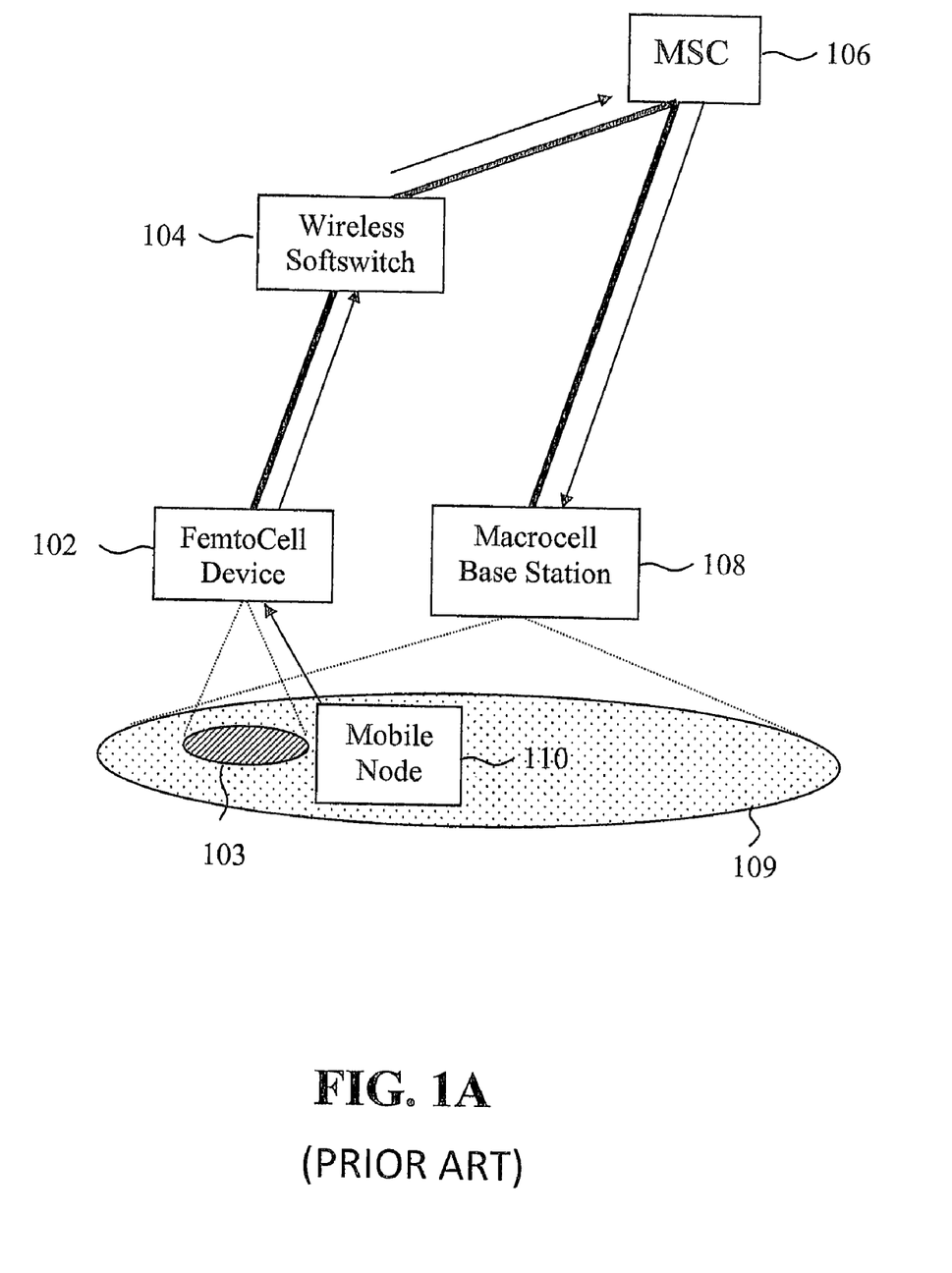
FIG. 1A schematically illustrates a wireless network for performing contemporary handoffs using standard inter-operability messaging.
Figure 1B:
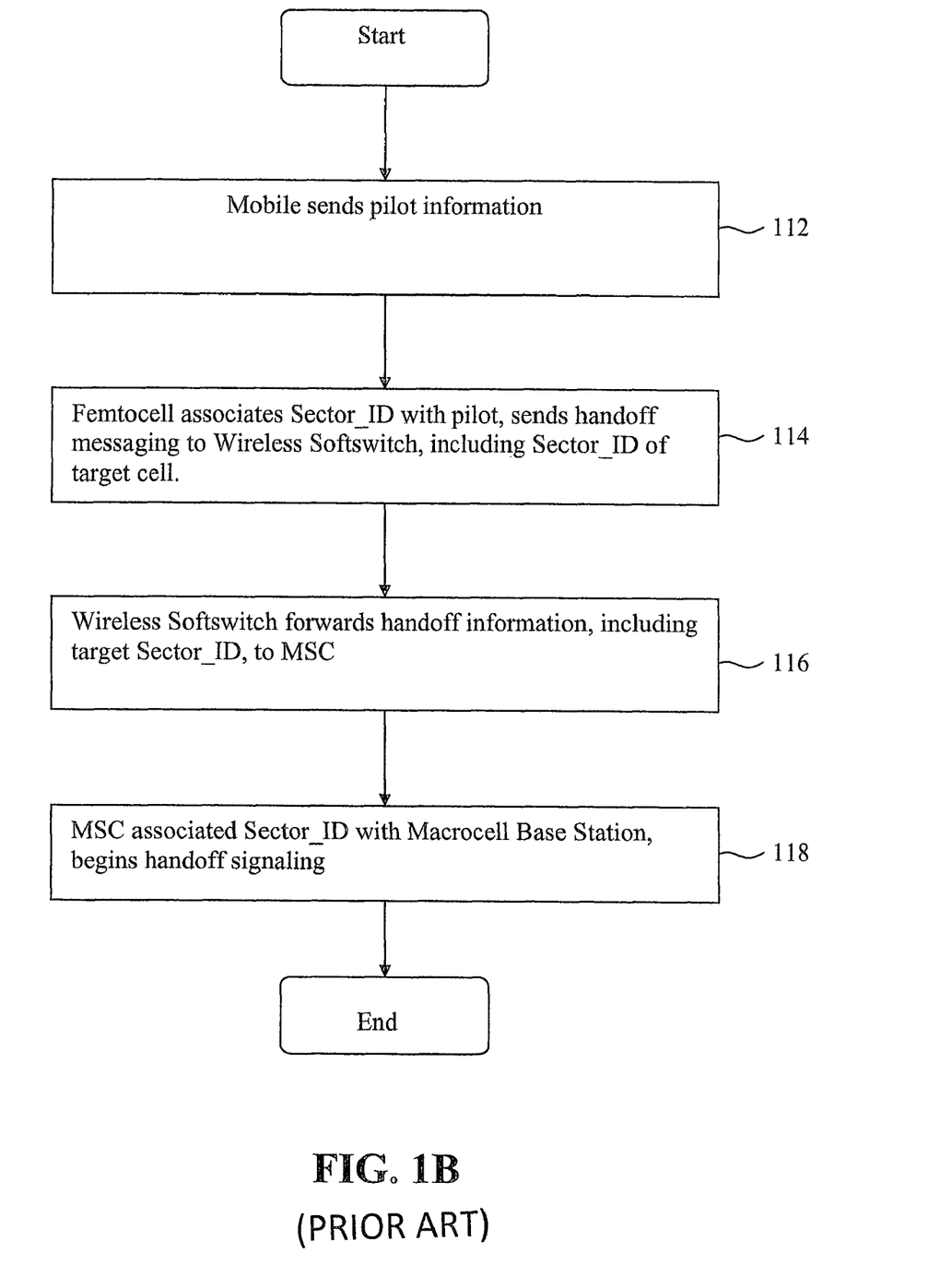
FIG. 1B is a flow chart outlining the contemporary handoff procedure using standard inter-operability messaging.

FIG. 1A schematically illustrates a wireless network for performing contemporary handoffs using standard inter-operability messaging, and FIG. 1B is a flow chart outlining the contemporary handoff procedure using standard inter-operability messaging. The network is constructed with a macrocell base station 108 serving a macro cell 109, a femtocell device 102 serving a femto cell 103 which is contained within macro cell 109, a wireless softswitch 104, and a mobile switch center (MSC) 106. Femtocell device 102 is using the same air interface technology as the macro network. A mobile node 110 monitors pilots from the macro-network and reports the pilot strength measurement to femtocell device 102 via step 112. If mobile node 110 ventures outside femtocell 103 served by femtocell device 102 (leaves the house, for example), femtocell device 102 will determine, based on pilot strength measurement reports received from mobile node 110, that a handoff to the macro-network is needed. Using configured parameters, femtocell device 102 associates the pilot pseudo-random (PN) number with the sector_identity (ID) of macro base station 108 serving macro cell 109 to which mobile node 110 is moved, and forwards the sector_ID to wireless softswitch 104 using the standard handoff messaging via step 114. Wireless softswitch 104 then forwards the sector_ID to MSC 106 via step 116. MSC 106 uses the sector_ID to contact the appropriate macro base station to arrange the handoff via step 118.

Figure 2A:
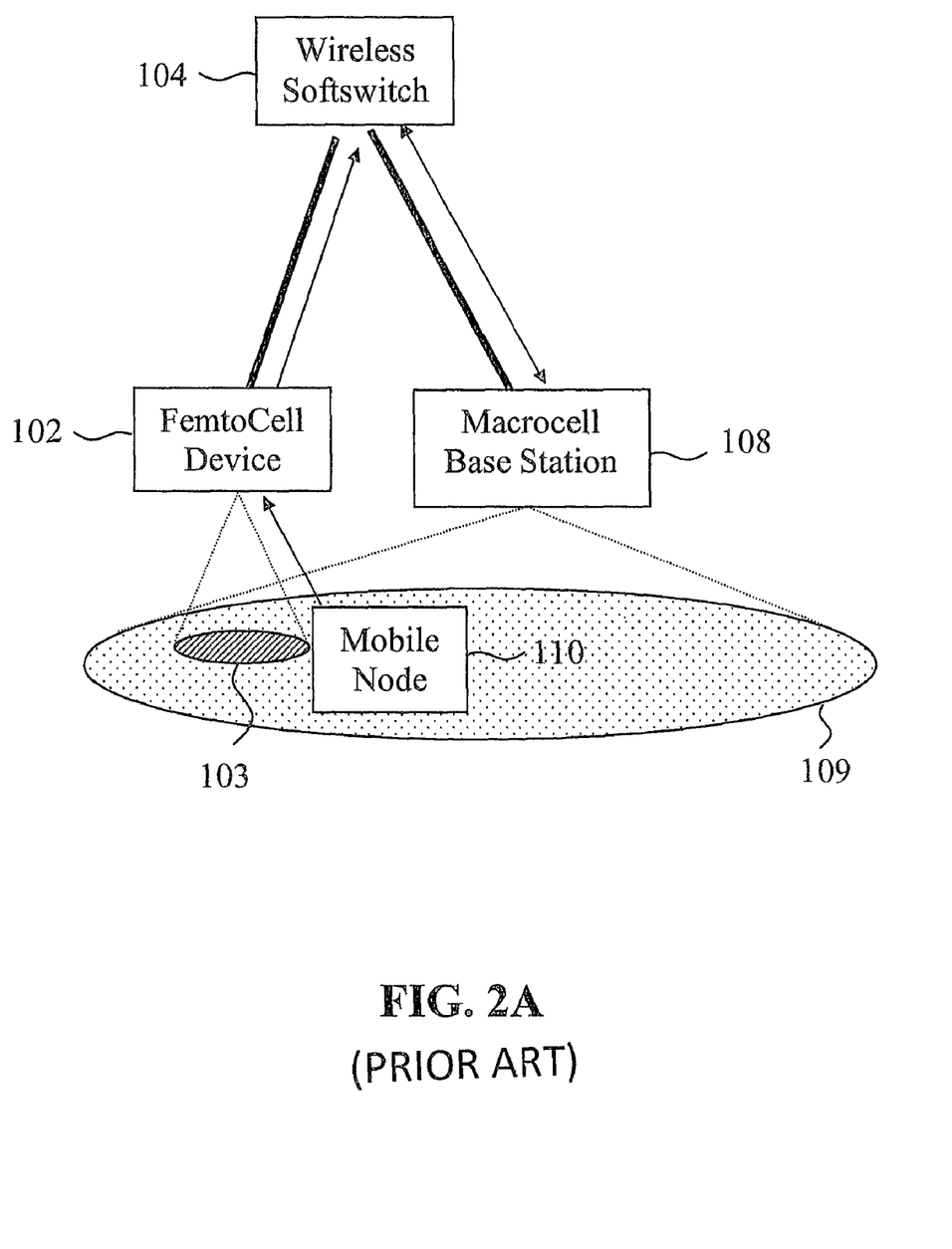
FIG. 2A schematically illustrates a wireless network for performing contemporary inter-technology handoffs using standard inter-operability messaging.
Figure 2B:
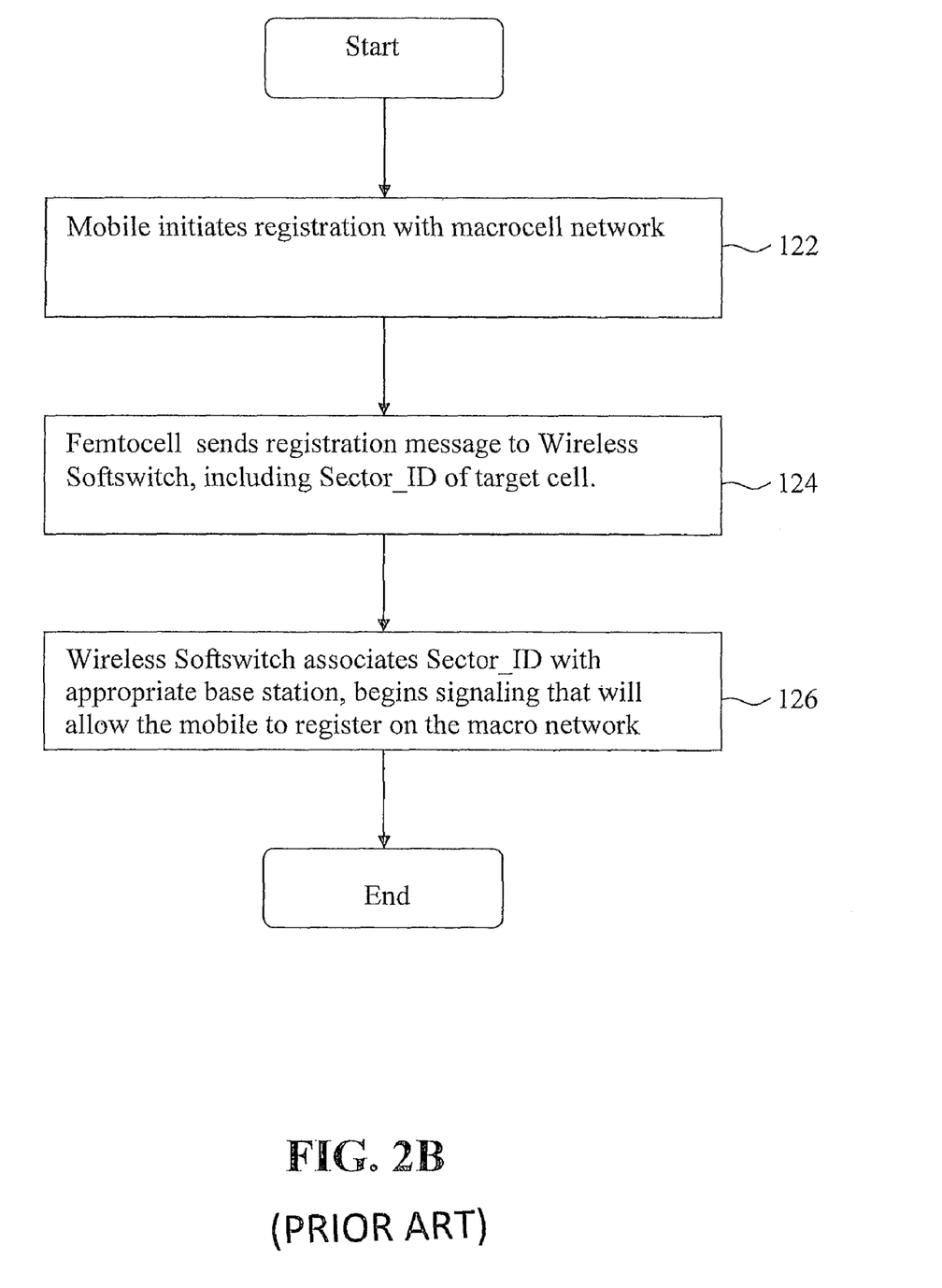
FIG. 2B is a flow chart outlining the contemporary inter-technology handoff procedure using standard inter-operability messaging.

FIG. 2A schematically illustrates a wireless network for performing contemporary inter-technology handoffs using standard inter-operability messaging, and FIG. 2B is a flow chart outlining the contemporary inter-technology handoff procedure using standard inter-operability messaging. Mobile node 110 may receive pilots from the macro-network, but mobile node 110 will not report these pilots to femtocell device 102, because femtocell device 102 is operating with a different technology than the one used by mobile node 110. In this situation, mobile node 110 initiates a handoff by sending a message that is destined for the macro-network, to femtocell device 102, such as a Registration Message, via step 122. Again, femtocell device 102 must be provisioned with the sector_ID or some type of identification for the target macro base station 108, so that femtocell device 102 can forward the registration message along with the sector_ID to wireless softswitch 104 via step 124. Wireless softswitch 104 associates the received sector_ID with appropriate base station, and begins signal that will allow mobile node 110 to register on the macro network via step 126.

The disadvantage of the contemporary inter-technology handoff process is that the femtocell devices need to be configured with some type of identifier (sector_ID, IP address, etc.) for the macro base station that is covering the area that the femtocell device is deployed in. Since a single macro base station may encompass a large area, many femtocell devices may need to be configured with this information at the time of deployment. Additionally, once configured with the information of the macro base station, the femtocell device can not move to a new location (i.e. into the coverage area of another macro base station) without being re-configured.

Such manual configurations are costly and can lead to errors in deployment. Therefore, the purpose of the invention is to allow femtocell devices to be deployed in macrocell networks which support alternative technologies, without requiring configuration of the femtocell device with specific information about the macrocell base stations around it. This may be used, for example, if a femtocell device which supports the LTE air interface is deployed in a 1×EV-DO macrocell, and handoffs from the LTE cell to the 1×EV-DO cell are expected. The invention does not require the femtocell device to have specific information about the macrocell base station that covers area the femtocell device resides in.

Figure 3A:
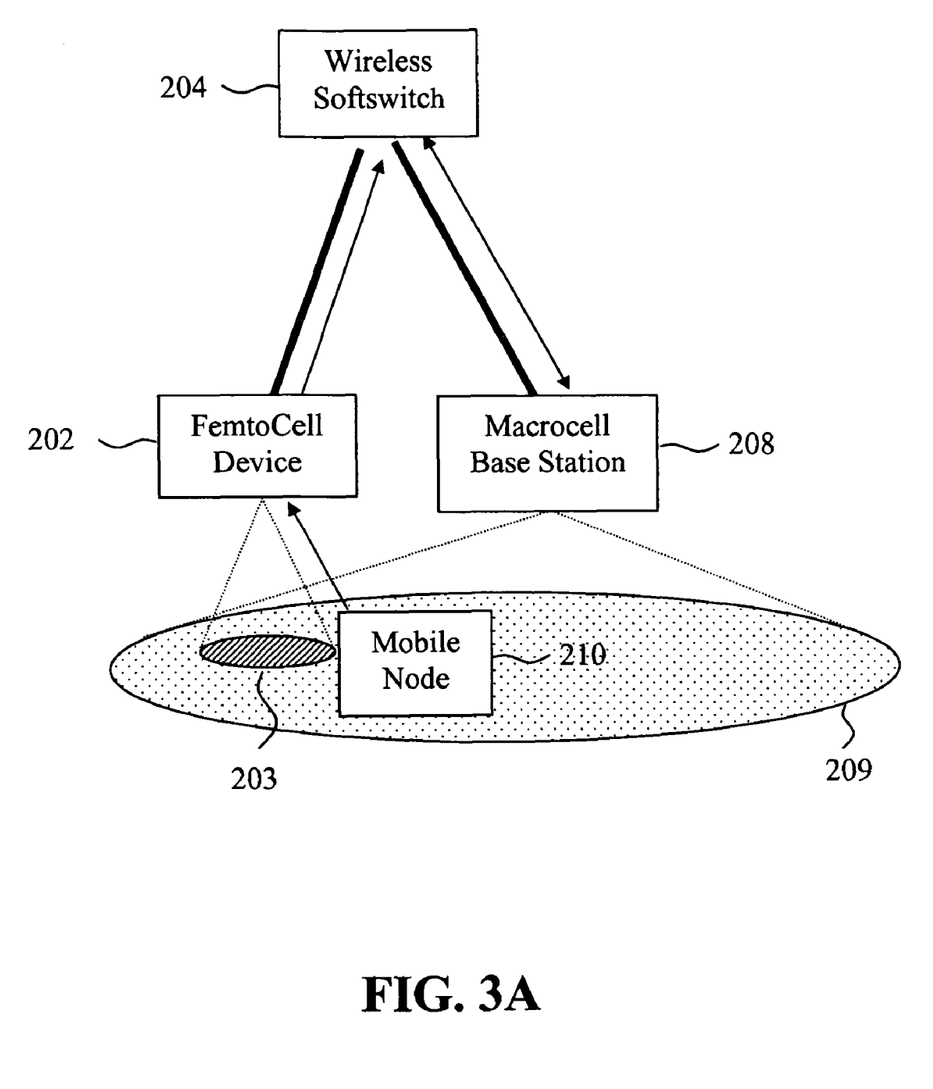
FIG. 3A schematically illustrates a block diagram of a wireless network for performing handoffs as an embodiment according to the principles of the present invention.
Figure 3B:
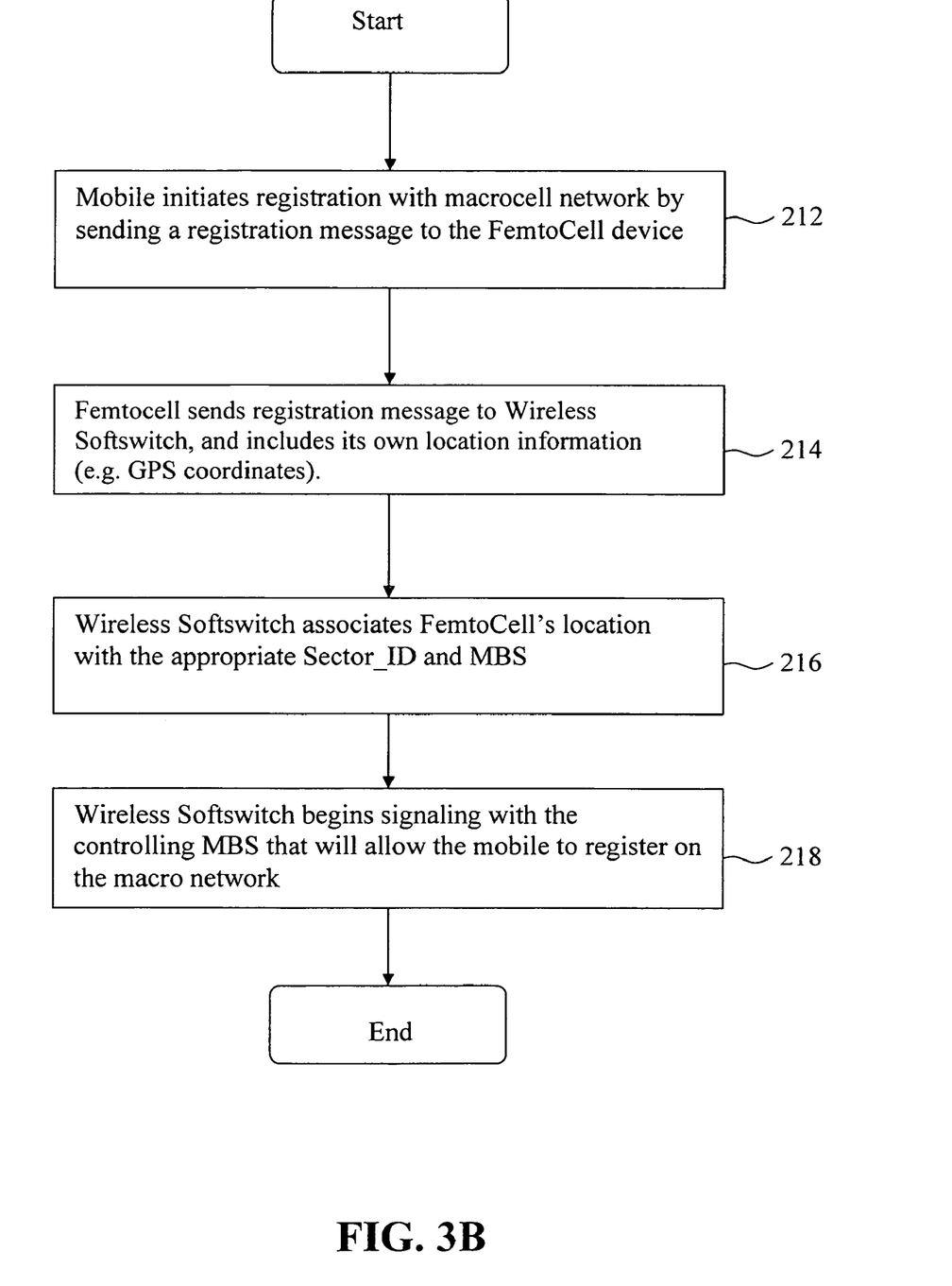
FIG. 3B is a flow chart outlining the procedure for performing handoffs in the wireless network as an embodiment according to the principles of the present invention.

FIG. 3A schematically illustrates a wireless network for performing inter-technology handoffs as an embodiment according to the principles of the present invention, and FIG. 3B is a flow chart outlining the inter-technology handoff procedure as an embodiment according to the principles of the present invention. The network is constructed with a macrocell base station (MBS) 208 serving a macro cell 209, a femtocell device (FCD) 202 serving a femto cell 203 which is contained within macro cell 209, and a wireless softswitch (WSS) 204. Femtocell device 202 is connected to wireless softswitch 204 through a Security Gateway (not shown). Femtocell device 202 supports a particular air interface (e.g., Long Term Evolution (LTE)), while macrocell base station 208 supports another air interface technology (e.g., 1×EV-DO). The invention also works if the FCD and the MBS support the same air interface technology.

As shown in FIG. 3A, a mobile node (MN) 210 ventures to macro cell 209 served by macrocell base station 208 from femtocell 203 served by femtocell device 202. Mobile node 210 transmits a registration message over the air interface to femtocell device 202 via step 212. Femtocell device 202 forwards this registration message to wireless softswitch 204, along with the location coordinates (e.g., GPS coordinates) of femtocell device 202, via step 214. Wireless softswitch 204 then makes an association between femtocell device 202 and macrocell base station 208 via step 216, and forwards the registration message to macrocell base station 208 via step 218. Signaling is then established between wireless softswitch 204 and macrocell base station 208 via step 218, that allows mobile node 210 to set up a session on macrocell base station 208, even though mobile node 210 has not had an air interface connection with macrocell base station 208 yet. Femtocell device 202 (or Wireless softswitch 204 through femtocell device 202) may then instruct mobile node 210 to handoff to macrocell base station 208.

The key feature of the present invention is that the wireless softswitch knows the geographical coverage area of each macrocell base station. In this way, once the femtocell device reports its location, the wireless softswitch can make an association between the femtocell device and the macrocell base station; the femtocell device does not need to be provisioned with this information. In addition, if the femtocell device is moved to a new location, and if the femtocell device is able to make a secure connection to a host wireless softswitch, the femtocell device can still hand out to a macrocell base station if there is one covering it. Since the wireless softswitch handles the association between femtocell device and macrocell base station, the femtocell device only needs to report its location to the WSS in order to for the handoff to be successful.

Figure 4A:
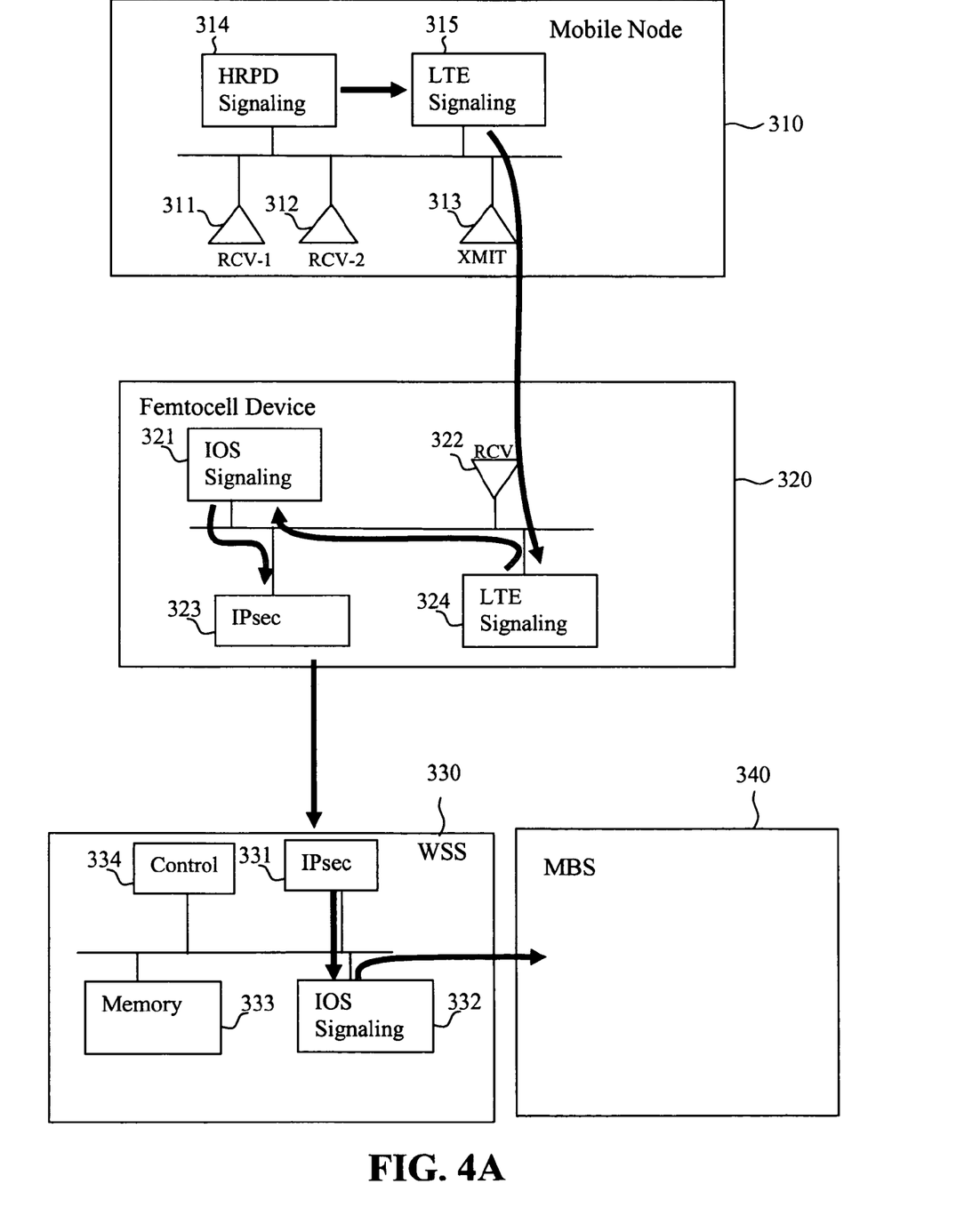
FIG. 4A schematically illustrates a wireless network for performing inter-technology handoffs as an embodiment according to the principles of the present invention.
Figure 4B:
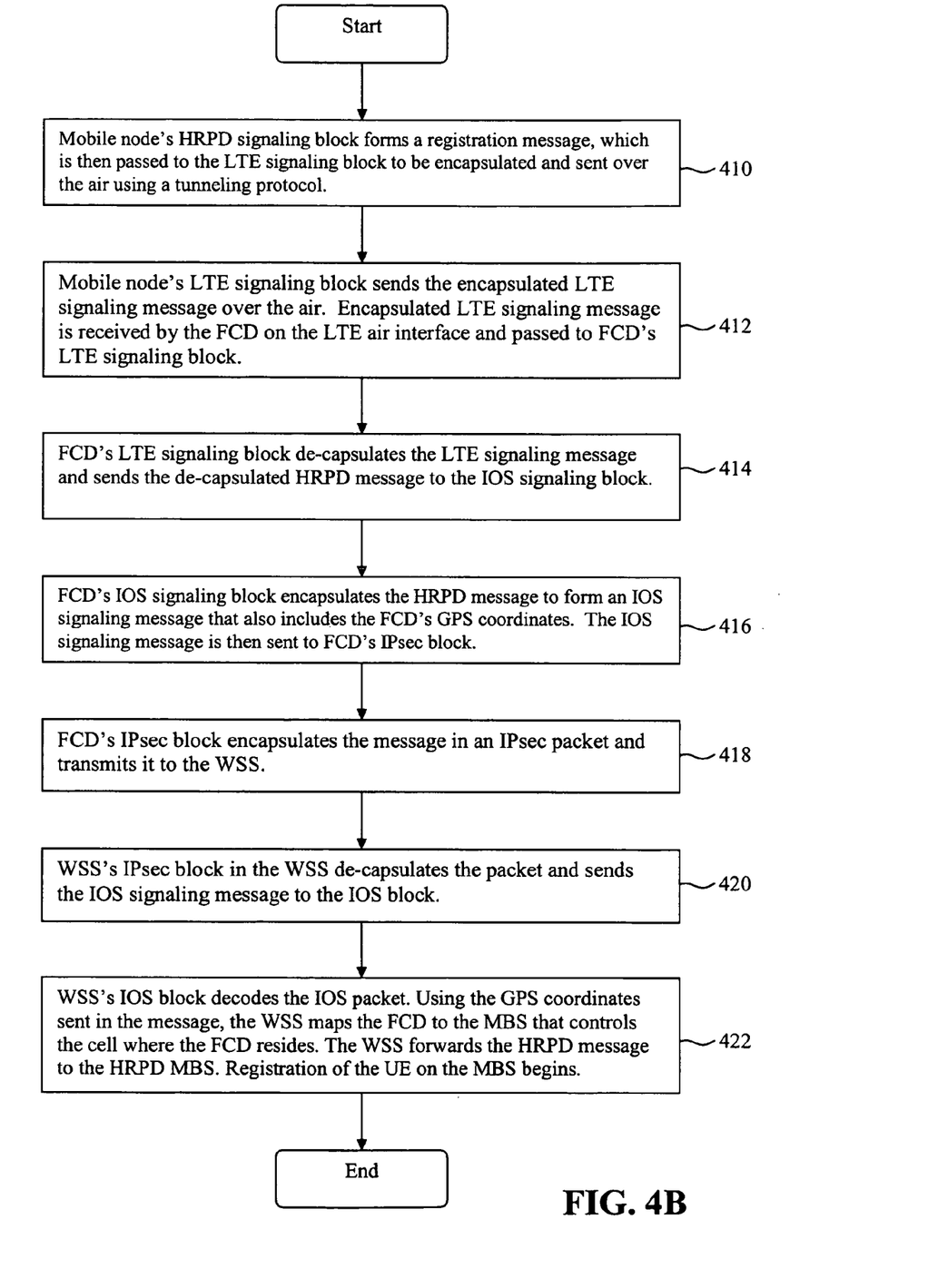
FIG. 4B is a flow chart outlining the inter-technology handoff procedure as an embodiment according to the principles of the present invention.

FIG. 4A schematically illustrates a block diagram of a wireless network for performing handoffs as an embodiment according to the principles of the present invention. FIG. 4B is a flow chart outlining the procedure for performing handoffs in the wireless network as an embodiment according to the principles of the present invention. In this example, mobile node 310 is constructed with two receiving blocks 311, 312, a transmitting blocks 313, a high rate packet data (HRPD) signaling block 314, and a LTE signaling block 315. Mobile node 310 is a dual receive single transmit device, which is capable of supporting both LTE and HRPD signaling. Femtocell Device (FCD) 320 is constructed with an Inter-Operability Specification (I0S) signaling block 321, a receiving block 322, an Internet Protocol security (Ipsec) block 323, and a Long Term Evolution (LTE) signaling block 324. Femtocell Device 320 supports the LTE air interface. Wireless softswitch 330 is constructed with an Internet Protocol security (IPsec) block 331, an Inter-Operability Specification (I0S) signaling block 332, a memory block 333 and a control block 334. Wireless softswitch 330 is connected with a plurality of macro cell base stations (MBS) and memory block 333 stores information regarding geographical coverage area of each of the plurality of MBSs. Macrocell base station (MBS) 340 supports HRPD.

As shown in FIGS. 4A and 4B, mobile node 310 that is currently being served by FCD 320, decides to handoff to the macrocell based on the signal strength of received pilot signal from both LTE and HRPD systems, i.e., femtocell and macrocell. Mobile node 310 initiates a handoff to NBS 340 by forming a HRPD registration message at HRPD signaling block 314 and transmitting the HRPD registration message to LTE signaling block 315 via step 410, encapsulating the HRPD registration message in LTE signaling block 315 and transmitting the LTE signaling message over the LTE air interface to FCD 320 via step 412. LTE signaling block 324 of FCD 320 de-capsulates the LTE signaling message to form an HRPD message and passes the HRPD message to IOS signaling block 321 via step 414, where the HRPD message is encapsulated to form an IOS message. The IOS message also contains the GPS coordinates of FCD 320. IPsec block 323 encapsulates the IOS message to form an IPsec packet and transmits the packet to WSS 330 over an IPsec tunnel via step 418. IPsec block 331 of WSS 330 receives the packet de-capsulates the packet to obtain the IOS message and passes the IOS message to IOS signaling block 332 via step 420. IOS signaling block 332 decodes the IOS message. Using the GPS coordinates included in the IOS message, controll block 334 of WSS 330 can determine the correct MBS to forward the HRPD message to using information about geographical coverage area of each of the MBSs stored in memory block 333. Then, WSS 330 forward the HRPD message to MBS 340 via step 422. HRPD session registration between mobile node 310 and MBS 340 can then commence using the LTE air interface as a transport mechanism. Again, the key to the invention is that the WSS can use the FCD's GPS coordinates to determine the correct MBS to forward the signal to; the FCD does not need to be provisioned with this information.

In should be appreciated that the functions necessary to implement the present invention may be embodied in whole or in part using hardware, software, firmware, or some combination thereof using micro-controllers, micro-processors, digital signal processors, programmable logic arrays, or any other suitable types of hardware, software, and/or firmware.

While the present invention has been shown and described in connection with the preferred embodiments, it will be apparent to those skilled in the art that modifications and variations can be made without departing from the spirit and scope of the invention as defined by the appended claims.

What is claimed is:

1. A wireless softswitch in a communication system, comprising:
   a memory block configured to store geographical coverage area information for each of a plurality of macrocell base stations, wherein the wireless softswitch is configured to communicate with the macrocell base stations and a femtocell device that is disposed in an area covered by a macrocell base station; and
   a control block configured to receive from the femtocell device a registration message for a mobile node, wherein the registration message is configured to prompt a handoff of the mobile node, and geographical location information for the femtocell device, without receiving an identifier for the macrocell base station such that, for the femtocell device, the handoff is independent of an air interface technology for the macrocell base station; to identify the macrocell base station based on the geographical location information for the femtocell device and the geographic coverage area information for each of the macrocell base stations stored in the memory block; and to forward the registration message for the mobile node to the identified macrocell base station.

2. The wireless softswitch of claim 1, further comprising:
   an Internet Protocol security block configured to receive the registration message and the geographical location information for the femtocell device encapsulated in an Inter-Operability Specification (IOS) message from the femtocell device; and
   an IOS signaling block configured to de-capsulate the IOS message, to obtain the registration message and the geographical location information for the femtocell device, and to form a high rate packet data (HRPD) message containing the registration message to be transmitted to the identified macrocell base station.

3. The wireless softswitch of claim 1, wherein the control block is further configured to exchange signals between the mobile node and the identified macrocell base station.

4. A method for handling handoff at a wireless softswitch in a communication system, the method comprising the steps of:

storing geographical coverage area information for each of a plurality of macrocell base stations, wherein the wireless softswitch is configured to communicate with the macrocell base stations and a femtocell device that is disposed in an area covered by a macrocell base station;

receiving from the femtocell device a registration message for a mobile node, wherein the registration message is configured to prompt a handoff of the mobile node, and geographical location information for the femtocell device, without receiving an identifier for the macrocell base station such that, for the femtocell device, the handoff is independent of an air interface technology for the macrocell base station;

identifying the macrocell base station based on the geographical location information for the femtocell device and the geographic coverage area information for each of the macrocell base stations; and forwarding the registration message for the mobile node to the identified macrocell base station.

5. The method of claim 4, further comprising:

receiving the registration message and the geographical location information for the femtocell device encapsulated in an Inter-Operability Specification (IOS) message from the femtocell device;

de-capsulating the IOS message to obtain the registration message and the geographical location information for the femtocell device; and forming a high rate packet data (HRPD) message containing the registration message to be transmitted to the identified macrocell base station.

6. The method of claim 4, further comprising exchanging signals between the mobile node and the identified macrocell base station.

7. A femtocell device in a communication system, comprising:

a receiving block configured to receive a registration message from a mobile node which is moving out of a femtocell served by the femtocell device, wherein the registration message is configured to prompt a handoff of the mobile node; and a signaling block configured to transmit the registration message and geographical location information for the femtocell device to a wireless softswitch without transmitting an identifier for a macrocell base station such that the handoff is independent of an air interface technology for the macrocell base station.

8. The femtocell device of claim 7, the signaling block comprising:

a Long Term Evolution (LTE) signaling block configured to receive the registration message encapsulated in an LTE message and to de-capsulate the LTE message to obtain the registration message;

an Inter-Operability Specification (IOS) signaling block configured to encapsulate the registration message and the geographical location information for the femtocell device in an IOS message; and an Internet Protocol security block configured to transmit the IOS message to the wireless softswitch.

9. A method for handling handoff in a femtocell device in a communication system, comprising:

receiving a registration message from a mobile node which is moving out of a femtocell served by the femtocell device, wherein the registration message is configured to prompt a handoff of the mobile node; and transmitting the registration message and geographical location information for the femtocell device to a wireless softswitch without transmitting an identifier for a macrocell base station such that the handoff is independent of an air interface technology type for the macrocell base station.

10. A method for handling handoff in a femtocell device in a communication system, comprising:

receiving at the femtocell device a registration message from a mobile node, wherein the femtocell device is deployed in a coverage area of a macrocell base station without being configured with an identifier for the macrocell base station; and transmitting from the femtocell device the registration message and geographical location information for the femtocell device to a wireless softswitch.

11. The method of claim 10, wherein the femtocell device is configured to support a first air interface and the macrocell base station is configured to support a second air interface different from the first air interface.

12. The method of claim 11, wherein the first air interface comprises Long Term Evolution.

13. The method of claim 10, wherein the registration message is configured to prompt a handoff of the mobile node from the femtocell device to the macrocell base station independent of an air interface technology for the macrocell base station.

14. A communication system comprising a femtocell device configured to receive a registration message from a mobile node and to transmit the registration message and geographical location information for the femtocell device to a wireless softswitch, wherein the femtocell device is deployed in a coverage area of a macrocell base station without being configured with an identifier for the macrocell base station.

15. The communication system of claim 14, wherein the femtocell device is further configured to support a first air interface and the macrocell base station is configured to support a second air interface different from the first air interface.

16. The communication system of claim 15, wherein the first air interface comprises a Long Term Evolution (LTE) air interface.

17. The communication system of claim 16, wherein the second air interface comprises a high rate packet data (HRPD) air interface.

18. The communication system of claim 17, wherein the registration message is generated by the mobile node in an HRPD format, encapsulated by the mobile node in an LTE message, and transmitted from the mobile node to the femtocell device as the LTE message.

19. The communication system of claim 16, wherein the femtocell device is further configured to de-capsulate an LTE message received from the mobile node to obtain the registration message, to encapsulate the registration message and the geographical location information for the femtocell device in an Inter-Operability Specification (IOS) message, and to transmit the registration message and the geographical location information for the femtocell device to the wireless softswitch by transmitting the IOS message to the wireless softswitch.

20. The communication system of claim 14, wherein the registration message is configured to prompt a handoff of the mobile node from the femtocell device to the macrocell base station such that, for the femtocell device, the handoff is independent of an air interface technology for the macrocell base station.

* * * * *